United States Patent
Li et al.

(10) Patent No.: US 9,732,687 B2
(45) Date of Patent: Aug. 15, 2017

(54) PEROVSKITE OXIDE COMPOUNDS FOR USE IN EXHAUST AFTERTREATMENT SYSTEMS

(75) Inventors: Wei Li, Troy, MI (US); David B. Brown, Brighton, MI (US); Chang H Kim, Rochester, MI (US); Gongshin Qi, Troy, MI (US); Steven J. Schmieg, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1835 days.

(21) Appl. No.: 12/975,449

(22) Filed: Dec. 22, 2010

(65) Prior Publication Data

US 2012/0159927 A1   Jun. 28, 2012

(51) Int. Cl.
| | |
|---|---|
| F01N 3/10 | (2006.01) |
| F02D 41/02 | (2006.01) |
| B01D 53/94 | (2006.01) |
| F02D 41/14 | (2006.01) |
| F01N 13/00 | (2010.01) |
| F01N 3/08 | (2006.01) |
| F01N 3/20 | (2006.01) |

(52) U.S. Cl.
CPC ..... *F02D 41/0275* (2013.01); *B01D 53/9422* (2013.01); *F01N 13/009* (2014.06); *F02D 41/1475* (2013.01); *B01D 2255/402* (2013.01); *B01D 2255/407* (2013.01); *B01D 2255/9032* (2013.01); *B01D 2255/9035* (2013.01); *B01D 2255/91* (2013.01); *F01N 3/0814* (2013.01); *F01N 3/0842* (2013.01); *F01N 3/106* (2013.01); *F01N 3/2073* (2013.01); *F01N 2510/0682* (2013.01)

(58) Field of Classification Search
USPC .................................. 60/274, 285, 297, 301
See application file for complete search history.

(56) References Cited

U.S. PATENT DOCUMENTS

| 5,227,145 A * | 7/1993 | Kintaichi et al. .......... 423/239.1 |
| 2005/0129601 A1 * | 6/2005 | Li et al. ..................... 423/239.2 |

(Continued)

FOREIGN PATENT DOCUMENTS

| CN | 101837291 A | 9/2010 |
| DE | 102010011404 A1 | 12/2010 |

OTHER PUBLICATIONS

Zhu et al., The reaction and poisoning mechanism of SO2 and perovskite LaCoO3 film model catalysts; Applied Catalysis A: General 209 (2001) pp. 71-77.

(Continued)

*Primary Examiner* — Mark Laurenzi
*Assistant Examiner* — Brandon Lee
(74) *Attorney, Agent, or Firm* — BrooksGroup (57) ABSTRACT

A method for removing $NO_X$ from an oxygen-rich exhaust flow produced by a combustion source that is combusting a lean mixture of air and fuel may include passing the oxygen-rich exhaust flow through an exhaust aftertreatment system that includes a $NO_X$ oxidation catalyst that includes perovskite oxide particles, a $NO_X$ storage catalyst, and a $NO_X$ reduction catalyst.

20 Claims, 6 Drawing Sheets

(56) References Cited

U.S. PATENT DOCUMENTS

2007/0105715 A1* 5/2007 Suda et al. .................. 502/303
2010/0229533 A1 9/2010 Li

OTHER PUBLICATIONS

Cheng et al., Stability of Materials as Candidates for Sulfur-Resistant Anodes of Solid Oxide Fuel Cells; Journal of the Electrochemical Society, 153 (7), 2006, pp. A1302-A1309.

Wang et al., Study on the poisoning mechanism of sulfur dioxide for perovskite La0.9Sr0.1CoO3 model catalysts; Catalysis Letters, vol. 82, No. 3-4, Oct. 2002, pp. 199-204.

Alifanti et al., Activity in methane combustion and sensitivity to sulfur poisoning of La1-xCexMn1-yCoyO3 perovskite oxides; Applied Catalysis B: Environmental 41 (2003), pp. 71-81.

Tanaka et al., Advances in designing perovskite catalysts; Current Opinion in Solid State and Materials Science 5 (2001) pp. 381-387.

U.S. Appl. No. 12/571,606, filed Oct. 1, 2009, Washcoating Technique for Perovskite Catalyst, Chang H. Kim.

U.S. Appl. No. 12/563,345, filed Sep. 21, 2009, Method and Architecture for Oxidizing Nitric Oxide in Exhaust Gas From Hydrocarbon Fuel Source With a Fuel Lean Combustion Mixture, Chang H. Kim.

U.S. Appl. No. 12/720,158, filed Mar. 9, 2010, Sulfur Tolerant Perovskite Supported Catalysts, Chang H. Kim.

Kim et al., Strontium-Doped Perovskites Rival Platinum Catalysts for Treating NOx in Simulated Diesel Exhuast; Science 327 (2010), pp. 1624-1627.

German Office Action dated Feb. 4, 2016; Application No. 10 2011 121 280.2; Applicant: GM Global Technology Operations LLC; 2 pages.

Chinese Office Action dated Mar. 6, 2015; Application No. 201110435090.3 ; Applicant: GM Global Technology Operations LLC. ; 12 pages.

* cited by examiner

PEROVSKITE OXIDE COMPOUNDS FOR USE IN EXHAUST AFTERTREATMENT SYSTEMS

TECHNICAL FIELD

The technical field relates generally to exhaust aftertreatment systems and, more particularly, to exhaust aftertreatment systems that include perovskite oxide particles for oxidizing NO (to $NO_2$) contained in an oxygen-rich exhaust flow produced by a combustion source.

BACKGROUND

A combustion source may combust a lean mixture of air and fuel to perform work in the most fuel-efficient manner. The hot, oxygen-rich exhaust flow generated by the combustion source may contain unwanted gaseous emissions and possibly some suspended particulate matter that may need to be converted to more innocuous substances before being released to the atmosphere. The gaseous emissions primarily targeted for removal include carbon monoxide (CO), unburned and partially burned hydrocarbons (HC's), and nitrogen oxide compounds ($NO_X$) comprised of NO and $NO_2$ along with nominal amounts of $N_2O$, Some notable examples of combustion sources that may periodically, or for long durations, combust a lean mixture of air and fuel include gas turbines, chemical process equipment, and vehicle internal combustion engines such as diesel engines (compression-ignited) and some gasoline engines (spark-ignited).

The oxygen-rich exhaust flow produced by the combustion source may be fed to a fluidly coupled exhaust aftertreatment system to dynamically remove continuously varying amounts of CO, HC's, $NO_X$, and suspended particulate matter if present. A typical exhaust aftertreatment system usually aspires to (1) oxidize CO into carbon dioxide ($CO_2$), (2) oxidize HC's into $CO_2$ and water ($H_2O$), (3) convert $NO_X$ gases into nitrogen ($N_2$) and $O_2$, and (4) capture and periodically burn off suspended particulate matter. But the relatively high amount of oxygen contained in the oxygen-rich exhaust flow hinders the reaction kinetics for certain catalytic reduction reactions. A specific reaction sequence that does not proceed very efficiently under such conditions is the reduction of ($NO_X$) to nitrogen over conventional fine particle platinum group metal (PGM) mixtures, for example, particles of platinum, palladium, and rhodium dispersed on alumina.

The exhaust aftertreatment system, as a result, may be outfitted with a specific catalyst material or collection of catalyst materials that can effectively decrease $NO_X$ concentrations in an oxygen-enriched environment in accordance with certain operating procedures. A lean $NO_X$ trap, or LNT, is but one available option that may be employed. A LNT generally operates by feeding the exhaust flow across a $NO_X$ storage catalyst that exhibits $NO_X$ gas trapping capabilities. A $NO_X$ oxidation catalyst and a $NO_X$ reduction catalyst are also intermingled with or situated near the $NO_X$ storage material. In operation, the $NO_X$ oxidation catalyst oxidizes NO to $NO_2$ and the $NO_X$ storage catalyst traps or "stores" $NO_2$ as a nitrate species when exposed to the oxygen-rich exhaust flow. At some point, however, the $NO_X$ storage catalyst needs to be purged of $NO_X$-derived nitrate species. The $NO_X$ storage catalyst may be purged by momentarily combusting a rich mixture of air and fuel at the combustion source to produce an oxygen-depleted exhaust flow that includes a reaction balance of oxidants ($O_2$, $NO_X$) and reductants (CO, HC's, $H_2$). The resultant delivery of oxygen-depleted exhaust flow to the $NO_X$ storage catalyst triggers the release of $NO_X$ gases and regenerates future $NO_X$ storage sites. The liberated $NO_X$ is reduced, largely to $N_2$, by the reductants present in the oxygen-depleted exhaust flow over the $NO_X$ reduction catalyst.

A conventional LNT typically includes a flow-through support body with an inlet that receives the oxygen-rich or oxygen-depleted exhaust flow and an outlet that delivers the exhaust flow from the support body. A mixture of PGMs and an alkali or alkaline earth metal compound is dispersed within a high surface-area alumina washcoat and loaded onto the support body. The mixture of PGMs includes platinum, which catalyzes the oxidation of NO and to some extent the reduction of $NO_X$, rhodium, which primarily catalyzes the reduction of $NO_X$, and palladium, which catalyzes the oxidation of CO and HC's. The alkali or alkaline earth metal compound provides trap sites for the reversible storage of $NO_2$ as a nitrate species. But platinum group metals, especially the relatively large amounts of platinum used in a conventional LNT, is rather expensive. Platinum has also been shown to suffer from poor thermal durability at higher temperatures.

SUMMARY OF EXEMPLARY EMBODIMENTS

A method for removing $NO_X$ from an oxygen-rich exhaust flow produced by a combustion source that is combusting a lean mixture of air and fuel may include passing the oxygen-rich exhaust flow through an exhaust aftertreatment system that includes a $NO_X$ oxidation catalyst that includes perovskite oxide particles, a $NO_X$ storage catalyst, and a $NO_X$ reduction catalyst.

Other exemplary embodiments of the invention will become apparent from the detailed description. It should be understood that the detailed description and specific examples, while disclosing exemplary embodiments of the invention, are intended for purposes of illustration only and are not intended to limit the scope of the claims that follow.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

A combustion source that combusts, at least part of the time, a lean mixture of air and fuel to perform work may be fitted with an exhaust aftertreatment system to help reduce the concentration of certain unwanted emissions, including $NO_X$, and particulate matter, if present, from a resultant oxygen-rich exhaust flow. The exhaust aftertreatment system may include a $NO_X$ oxidation catalyst that includes perovskite oxide particles, a $NO_X$ storage catalyst, and a $NO_X$ reduction catalyst. These three catalysts (oxidation, storage, and reduction) are able to cooperatively convert an appreciable amount of the $NO_X$ emanated from the combustion source into nitrogen when cyclically exposed to the oxygen-rich exhaust flow and an oxygen depleted-exhaust flow produced by, for example, interrupting the combustion of the lean mixture of air and fuel with the combustion of a rich mixture of air and fuel. The use of platinum as a $NO_X$ oxidation catalyst may be substantially diminished or altogether eliminated as a corollary of the perovskite compound's $NO_X$ oxidation activity when exposed to the oxygen-rich exhaust flow.

Figure 1:
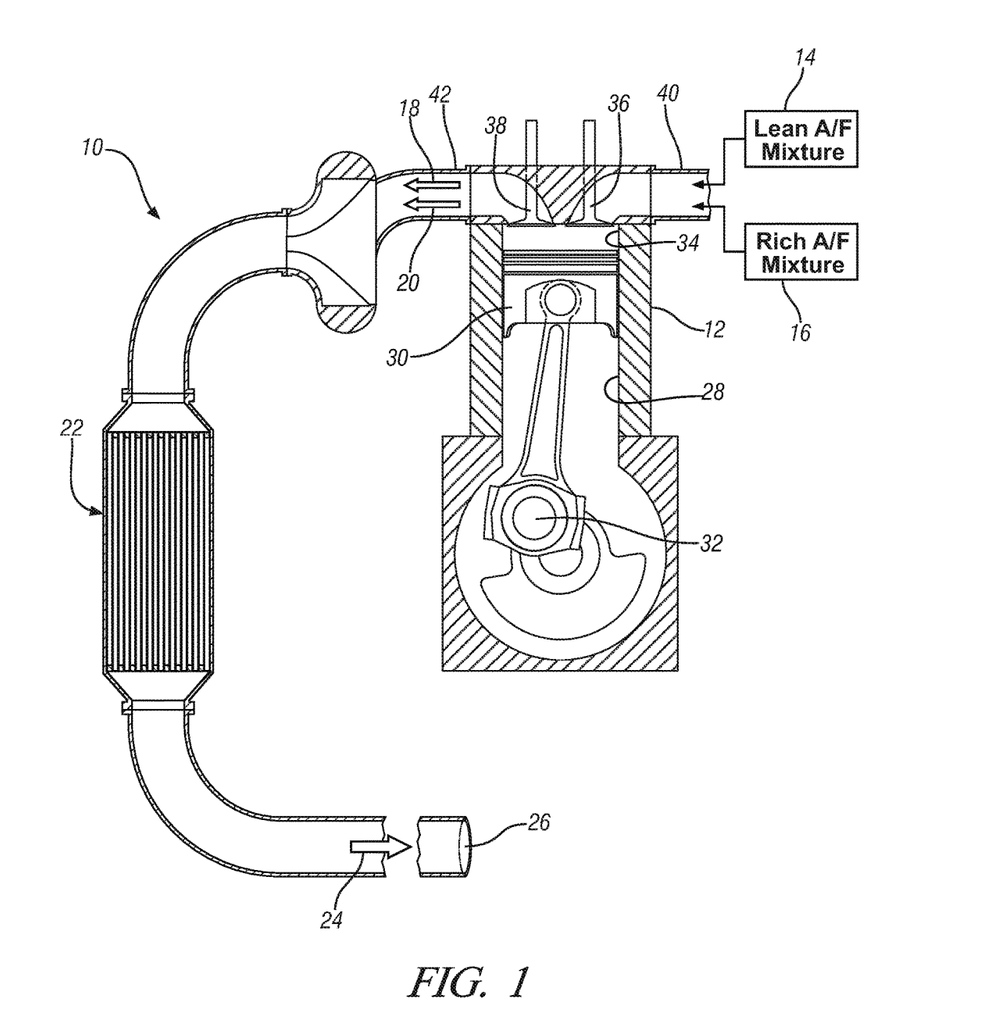
FIG. 1 is a schematic illustration of an exhaust aftertreatment system that includes a lean $NO_X$ trap according to one embodiment of the invention.

A first embodiment of the exhaust aftertreatment system, identified as numeral 10, is illustrated in FIG. 1. A multi-cylinder, reciprocating internal combustion engine 12 constitutes the combustion source and is fluidly coupled to the exhaust aftertreatment system 10. The engine 12 cyclically combusts a lean mixture of air and fuel 14 ("lean A/F mixture") and a rich mixture of air and fuel 16 ("rich A/F mixture") to correspondingly provide an oxygen-rich exhaust flow 18 and an oxygen-depleted exhaust flow 20, respectively, to the exhaust aftertreatment system 10 in known controlled fashion. Both the lean A/F mixture 14 and the rich A/F mixture 16 are defined by an air to fuel mass ratio.

The lean A/F mixture 14 contains more air than is stoichiometrically necessary to combust the dispensed fuel. The air to fuel mass ratio of the lean A/F mixture 14 is usually greater than 14.6-14.8, which is the approximate stoichiometric air to fuel mass ratio of gasoline fuel, and, in most instances, lies somewhere in the range of about 20-65 depending on the design of the engine 12 and the type of fuel being combusted. The combustion of lean A/F mixture 14 produces the oxygen-rich exhaust flow 18. The oxygen-rich exhaust flow 18 may reach temperatures as high as 900° C. and, as used herein, comprise greater than 1.0 vol. % $O_2$ up to about 10 vol. %. The oxygen-rich exhaust flow 18 may also comprise some $NO_X$ and HC's, nominal amounts of CO, maybe some suspended particulate matter (i.e., diesel engines) and the balance $N_2$, $CO_2$, and $H_2O$. The $NO_X$ contingent of the oxygen-rich exhaust flow 18 generally ranges from about 50 ppmv to about 1500 ppmv and includes greater than 90 mol % NO and less than 10 mol % $NO_2$. The amount of HC's present generally ranges from about 250 ppmv to about 750 ppmv.

The rich A/F mixture 16 contains the stoichiometric amount of air needed to combust the dispensed fuel or less. The air to fuel mass ratio of the rich A/F mixture 14 usually lies somewhere in the range of about 12-14.7 for gasoline and diesel fuels. The combustion of the rich A/F mixture 16 produces the oxygen-depleted exhaust flow 20. The term "oxygen-depleted exhaust" as used herein shall mean exhaust gas having less than 1.0 vol. % $O_2$. The oxygen-depleted exhaust flow 20 may reach temperatures as high as 1000° C. and have less than 1.0 vol. % $O_2$ and usually less than 0.5 vol. %. The oxygen-depleted exhaust flow 20 may also comprise some $NO_X$, CO, and HC's, maybe some suspended particulate matter (i.e., diesel engines) and the balance $N_2$, $CO_2$, and $H_2O$. The $NO_X$ contingent of the oxygen-depleted exhaust flow 20, similar to before, generally ranges from about 50 ppmv to about 1500 ppmv and includes greater than 90 mol % NO and less han 10 mol % $NO_2$. The amount of CO and HC's present generally range from about 0.5 vol. % to about 1.0 vol. % and from about 500 ppmv to about 1000 ppmv, respectively.

It should be noted that FIG. 1 identifies separate feeds of the lean A/F mixture 14 and the rich A/F mixture 16 and separate flows of the oxygen-rich exhaust flow 18 and the oxygen-depleted exhaust flow 20 for ease of description only. The engine 12, in actuality, as further described below, is supplied with a continuous air flow at a variable mass flow rate responsive to engine performance demands (i.e, pressing and depressing a foot pedal located in the driverside compartment to affect vehicle speed and acceleration). A calculated quantity of pressurized fuel is rapidly and intermittently injected into an incoming air flow just upstream from the engine 12, as dictated by an engine control strategy, to produce a mixture of air and fuel that exhibits the instantly desired air to fuel mass ratio. The quantity of fuel injected into the incoming air flow is controlled to maintain a lean air to fuel mass ratio (the lean A/F mixture 14) or a rich air to fuel mass ratio (the rich A/F mixture 16), or to switch between the two states. The nomenclature used with respect to FIG. 1, therefore, refers to the current air to fuel mass ratio of the mixture of air and fuel being fed to the engine 12 and the resultant exhaust flow being discharged from the engine 12 following combustion of that mixture.

The multi-cylinder, reciprocating internal combustion engine 12 may be a charge compression engine (i.e., diesel engine), a spark ignition direct injection engine (i.e., gasoline engine), or a homogeneous charge compression ignition engine. Each of these types of engines includes cylinders 28 (usually four to eight cylinders) that accommodate reciprocating piston heads 30 connected to a crankshaft 32. Located above each piston head 30 is a combustion chamber 34 that sequentially receives the lean A/F mixture 14 or the rich A/F mixture 16 through an intake valve 36 at specifically timed intervals. The spark or compression assisted ignition of the lean or rich A/F mixture 14, 16 in the combustion chambers 34 invokes rapid downward linear movement of their respective piston heads 30 to drive rotation of the crankshaft 32. The reactive upward movement of each piston head 30, a short time later, expels the combustion products from each combustion chamber 34 through an exhaust valve 38.

The multi-cylinder, reciprocating internal combustion engine 12 may be fluidly coupled to an intake manifold 40 and an exhaust manifold 42. The intake manifold 40 delivers the lean A/F mixture 14 or the rich A/F mixture 16 to the combustion chambers 34. The air portion of the lean or rich A/F mixture 14, 16 is supplied by an air induction system (not shown) that includes a throttle body valve. The air induction system throttles a continuous air flow at a variable mass flow rate towards the engines cylinders 28. The fuel portion of the lean or rich A/F mixture 14, 16 is supplied by fuel injectors (not shown) that dispense pressurized fuel into the incoming air flow. The exhaust manifold 42 collects the combustion products expelled from each combustion chamber 34 and delivers them to the exhaust aftertreatment system 10 as the oxygen-rich exhaust flow 18 (if the lean A/F mixture 14 is being combusted) or the oxygen-depleted exhaust flow 20 (if the rich A/F mixture is being combusted).

An electronic fuel injection system (not shown) may continuously manage the mixture of air and fuel delivered to the engine 12 in accordance with an engine control strategy. The electronic fuel injection system utilizes an electronic control module (ECM) that includes a microprocessor or a microcontroller, a memory capacity that stores pre-programmed look-up tables and software, and related circuitry to receive data and send command signals. The ECM constantly receives data indicative of the current operating state of the engine 12 from a variety of sensors. These sensors may include an air mass flow sensor, a throttle body valve position sensor, an engine coolant temperature sensor, an intake camshaft position sensor, a crankshaft position sensor, and an exhaust oxygen sensor. The interrelated data received from the sensors is compared against the preprogrammed look-up tables and/or plugged into an algorithm to calculate precisely how much fuel is needed to deliver the desired mixture of air and fuel to the engine's cylinders 28. The ECM then sends corresponding output signals to the fuel injectors located on the engine 12 to dispense the proper amount of fuel into the incoming air flow. The ECM performs these operations thousands of times every minute and, as a result, is quickly responsive to changing engine operating conditions and can effectuate rapid transitions between the lean A/F mixture 14 and the rich A/F mixture 16, and vice versa, when appropriate.

The exhaust aftertreatment system 10 alternately communicates the oxygen-rich exhaust flow 18 and oxygen-depleted exhaust flow 20 through a LNT 22 to manage $NO_X$. The LNT 22 includes a series of catalyst materials supporting finely dispersed catalyst particles that can cooperatively remove upwards of 90% or more of the $NO_X$ produced by the engine 12. The LNT 22, broadly speaking, strips $NO_X$ from the oxygen-rich exhaust flow 18 while the engine is combusting the lean A/F mixture 14. The stripped $NO_X$ is stored and accumulated as a nitrate species until the oxygen-depleted exhaust flow 20 is delivered to the LNT 22. The oxygen-depleted exhaust flow 20, once delivered, liberates and reduces the previously stored $NO_X$ as well as native $NO_X$ with various reductants whose presence is attributed to the combustion of the rich A/F mixture 16. This cycle, which is repeated often during operation of the engine, continuously produces a treated exhaust flow 24 composed mainly of $N_2$, $O_2$, $CO_2$, and $H_2O$ as well as acceptably low levels of $NO_X$. The LNT further contributes to the compositional makeup of the treated exhaust flow 24 by oxidizing, to some extent, CO and HC's into $CO_2$ and $H_2O$. The exhaust aftertreatment system 10 guides the treated exhaust flow 24 through additional catalytic components, if needed, and towards a tailpipe opening 26 for expulsion to the atmosphere.

The exhaust aftertreatment system 10 may include other devices or mechanical equipment not expressly shown in FIG. 1 that may or may not help produce the treated exhaust flow 24. These devices include, for example, a diesel oxidation catalyst, a three-way-catalyst, a diesel particulate filter, an exhaust gas recirculation line, a turbocharger turbine, a muffler, and/or a resonator. Skilled artisans will undoubtedly know of, and understand, these and the many other devices that may be included in and around the exhaust aftertreatment system 10.

Figure 2:
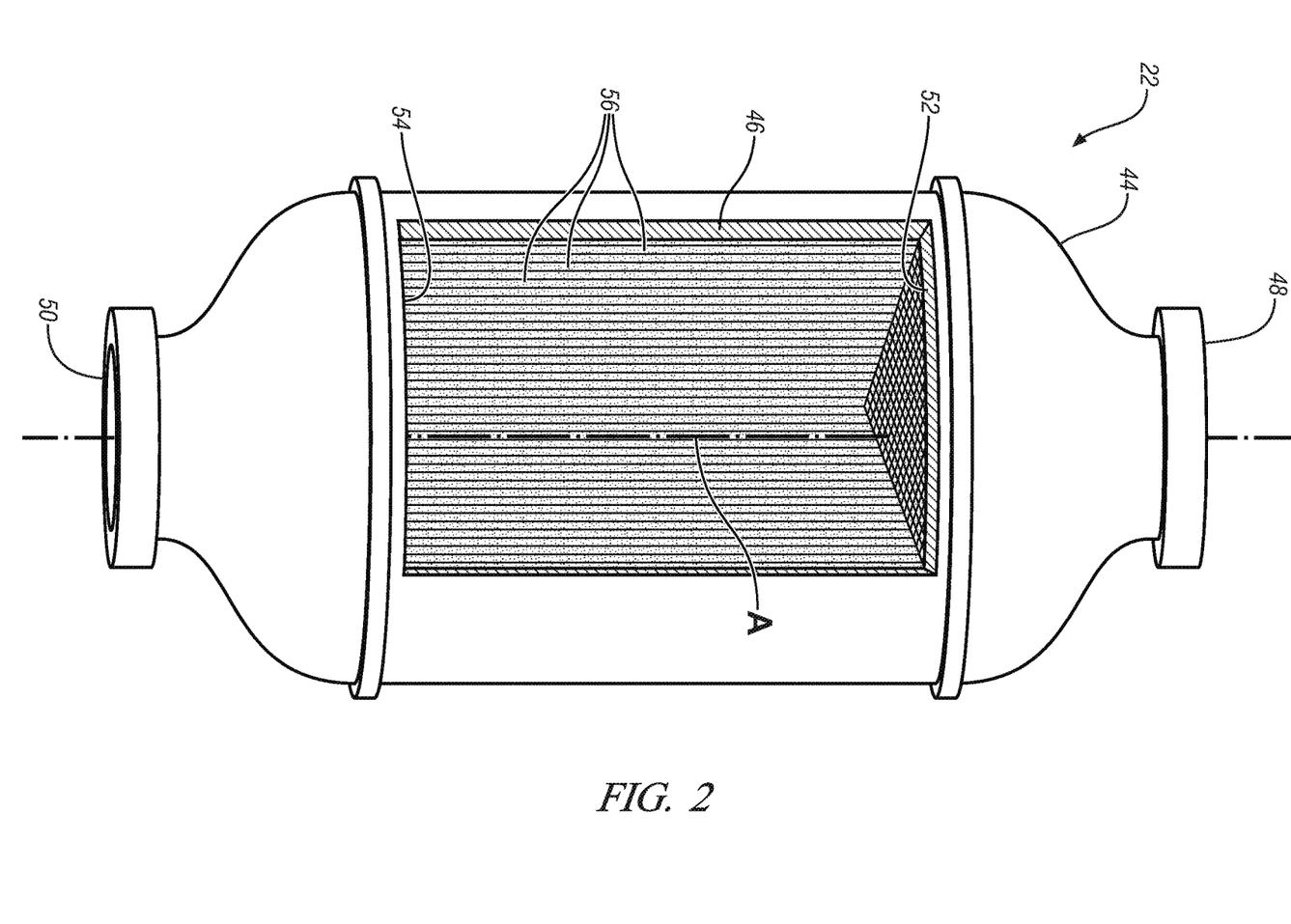
FIG. 2 is a perspective and partial cut-away view of an exemplary embodiment of the lean $NO_X$ trap illustrated in FIG. 1.

The lean $NO_X$ trap 22, as shown best in FIG. 2, comprises a canister 44 that houses a support body 46 and includes an inlet 48 and an outlet 50. The canister 44 may be cylindrical in shape, as shown, or may assume any other desired geometry. The inlet 46 and the outlet 48 are located on opposite sides of the canister 44 and are slightly tapered to accommodate fluid connections with upstream and downstream piping. The canister 44 may be fabricated from stainless steel and piped within the exhaust aftertreatment system 10 to form a contained flow path, having a longitudinal flow axis A, through which the oxygen-rich or oxygen depleted exhaust flow 18, 20 navigates.

The support body 46, as shown in partial cross-section, is a monolithic honeycomb structure that includes an inlet end 52, an outlet end 54, and several hundred (i.e., 400 or so) parallel flow-through channels 56 per square inch that extend from the inlet end 52 to the outlet end 54 in general parallel alignment with the flow axis A. The inlet end 52 and the outlet end 54 are located near the inlet 48 and the outlet 50 of the canister 44, respectively. The flow-through channels 54 are at least partially defined by a wall surface 58, shown best in FIG. 3, over which a respective portion of the oxygen-rich or oxygen-depleted exhaust flow 18, 20 passes while traversing the support body 46. The monolithic honeycomb structure may be formed from any material capable of withstanding the temperatures and chemical environment associated with the oxygen-rich or oxygen-depleted exhaust flow 18, 20. Some specific examples of materials that may be used include ceramics such as extruded cordierite, silicon carbide, silicon nitride, zirconia, mullite, spodumene, alumina-silica-magnesia, zirconium silicate, sillimanite, petalite, or a heat and corrosion resistant metal such as titanium or stainless steel.

Figure 3:
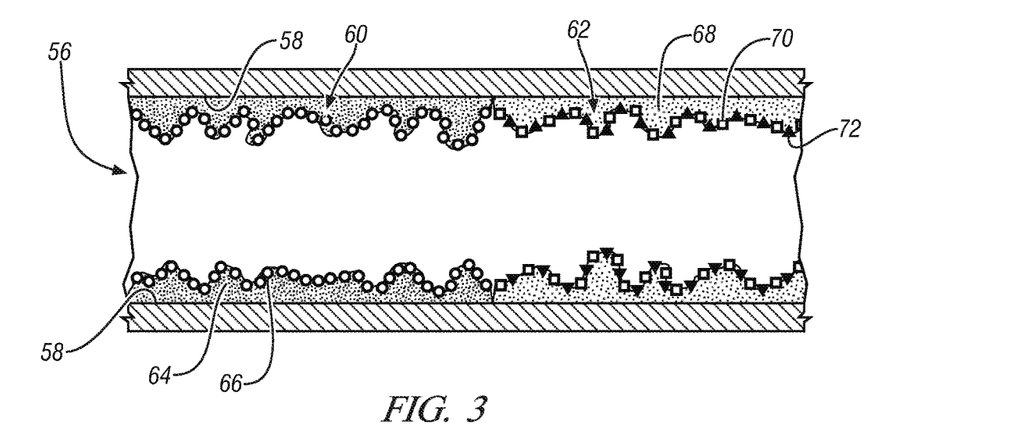
FIG. 3 is a partial magnified view of the lean $NO_X$ trap shown in FIG. 2 that depicts, in an idealized manner, a first catalyst material and a second catalyst carried by a support body according to one embodiment of the invention.

A first catalyst material 60 and a second catalyst material 62, as shown in FIG. 3, are deposited on the wall surfaces 58 of the flow-through channels 56. The first catalyst material 60 comprises a first carrier material 64 that supports a $NO_X$ oxidation catalyst 66 that includes finely divided perovskite oxide particles. The second catalyst material comprises a second carrier material 68 that supports a $NO_X$ storage catalyst 70 and a $NO_X$ reduction catalyst 72. The second catalyst material 62 is deposited downstream from the first catalyst material 60 relative to the flow direction of the oxygen-rich or oxygen-depleted exhaust flow 18, 20 (that is, along the flow axis A from the inlet end 52 to the outlet end 54 of the support body 46). Any known technique may be employed to prepare and deposit the catalyst materials 60, 62 such as, for example, conventional washcoating. The first and second catalyst materials 60, 62 shown in FIG. 3 are merely idealized depictions; they are not drawn to scale and are not meant to represent the actual dispersal pattern of the catalysts 66, 70, 72. In practice the finely divided catalyst particles would be well dispersed within the many porosities defined by the much larger, high-surface area, conglomerate support particles that constitute the first and second carrier materials 64, 68.

Many deposition arrangements of the first catalyst material 60 and the second catalyst material 62 are possible on the support body 46. For example, the first catalyst material 60 may be deposited on one-half of the support body 46 near the inlet end 52 and the second catalyst material 62 may be deposited the remaining half of the support body 46 near the outlet end 54. This arrangement provides two equally-sized and substantially distinguishable catalyst beds that, together, span the entire support body 46. As another example, the first catalyst material 60 and the second catalyst material 62 may be alternately deposited several times on the support body 46 from the inlet end 52 to the outlet end 54. This arrangement provides multiple alternating and substantially distinguishable catalyst beds that span the entire support body 46. Two to five pairs of the first and second catalyst materials 60, 62 are preferred.

The first and second carrier materials 64, 68 may be the same or different and generally exhibit a relatively high surface area with many loading or dispersion sites for accommodating their respective fine catalyst particles. The surface area of the carrier materials 64, 68 may range from about 20 m$^2$/gram to about 300 m$^2$/gram. The carrier materials 64, 68 may, for example, comprise a high-surface area mixed cerium and zirconium oxide material ($CeO_2$—$ZrO_2$). This material provides a high-surface area as well as some additional relevant functionality. $CeO_2$—$ZrO_2$ materials have, more specifically, demonstrated some ability to enhance the $NO_2$ storage at low temperatures, stabilize certain catalysts so that loading requirements can be reduced, and promote the water-gas shift reaction. The carrier materials 64, 68 may also comprise alumina ($Al_2O_3$), a ZSM-5 zeolite, or any other suitable material known to skilled artisans. A preferred loading of the first and second carrier materials 64, 68 is about 100 g to about 200 g per liter of available flow volume through the support body 46.

The $NO_X$ oxidation catalyst 66, as already mentioned, includes finely divided perovskite oxide particles. These particles encompass a broad class of non-noble metal mixed oxides defined by the general formula $ABO_3$. The "A" and "B" atoms are complimentary cations of different sizes that coordinate with oxygen anions. The larger, centrally located "A" cation is surrounded by smaller "B" cations. The "A" and "B" cations respectively coordinate with twelve and six oxygen anions. Small amounts of the "A" and/or "B" cations may also be substituted with different yet similarly sized "A1" and "B1" promoter cations to provide a supercell crystal structure similar to general $ABO_3$ crystal structure but defined by the formula $A_{1-x}A1_xB_{1-y}B1_yO_3$. A preferred loading of the finely divided perovskite oxide particles in the first catalyst material 60 is about 50 g to about 150 g per liter of available flow volume through the support body 46.

The perovskite oxide particles may comprise the same perovskite oxide or a mixture of two or more perovskite oxides. A great many combinations of perovskite oxides are available for use since no fewer than 27 cations may be employed as the "A" cation and no fewer than 36 cations may be employed as the "B" cation. A listing of the cations most frequently employed as the "A" cation includes those of calcium (Ca), strontium (Sr), barium (Ba), bismuth (Bi), cadmium (Cd), cerium (Ce), lead (Pb), yttrium (Y), and lanthanum (La) while a listing of the cations most commonly employed as the "B" cation includes those of cobalt (Co), titanium (Ti), zirconium (Zr), niobium (Nb), tin (Sn), cerium (Ce), aluminum (Al), nickel (Ni), chromium (Cr), manganese (Mn), copper (Cu), and iron (Fe). Some specific and exemplary perovskite oxides that may constitute all or part of the perovskite oxide particles include $LaCoO_3$, $La_{0.9}Sr_{0.1}CoO_3$, $LaMnO_3$, $La_{0.9}Sr_{0.1}MnO_3$, $LaFeO_3$, and $La_{0.9}Sr_{0.1}FeO_3$.

The perovskite oxide particles catalytically oxidize NO to $NO_2$ when exposed to the oxygen-rich exhaust flow 18. The perovskite oxide crystalline lattice (i.e., $ABO_3$ or $A_{1-x}A1_xB_{1-y}B1_yO_3$) can accommodate several different lattice defects that often create oxygen vacancies. These oxygen vacancies, without being bound by theory, are believed to contribute significantly to the perovskite oxide's NO oxidation activity as oxygen contained in the oxygen-rich exhaust flow 18 disassociates to fill those vacancies leaving behind residual oxygen radicals that quickly attach NO. The ability of the perovskite oxide particles to efficiently oxidize NO to $NO_2$ may significantly diminish or altogether eliminate the need to include platinum in the first or second catalyst materials 60, 62 for NO oxidation purposes. The first catalyst material 60 may, as a result, include only trace amounts of platinum or no platinum at all.

The $NO_X$ storage catalyst 70 and the $NO_X$ reduction catalyst 72 may be any suitable material known to skilled artisans. The $NO_X$ storage catalyst 70 comprises any compound that can trap and store $NO_2$ contained in the oxygen-rich exhaust flow 18 and, conversely, release $NO_X$ gases into the oxygen-depleted exhaust flow 20. A number of alkali or alkaline earth metal compounds operate in such a fashion through the reversible formation of a nitrate species and, as such, may constitute all or part of the $NO_X$ storage catalyst 70. Some specific and exemplary alkali or alkaline earth metal compounds that may be employed include fine particles of BaO, $BaCO_3$, and $K_2CO_3$. A preferred loading of these finely divided particulate materials is about 10 g to about 50 g per liter of available flow volume through the support body 46. The $NO_X$ reduction catalyst 72 comprises any compound that can reduce $NO_X$ gases in the oxygen-depleted exhaust flow 20. Fine particles of rhodium can provide such reductive activity and may constitute all or part of the $NO_X$ reduction catalyst 72. A preferred loading of finely divided rhodium is about 0.10 g to about 0.30 g per liter of available flow volume through the support body 46.

Other catalyst particles may also be dispersed on the carrier materials 64, 68 of the first and/or second catalyst materials 60, 62. Finely dispersed palladium particles, for example, can help oxidize any residual HC's and CO present in the oxygen-rich or oxygen-depleted exhaust flows 18, 20 and help slow the rate at which the perovskite oxide particles succumb to sulfur poisoning when sulfur-containing fuels are combusted in the engine 12. A preferred loading for palladium, if included, may be about 1.0 g to about 5.0 g of available flow volume through the support body 46.

A specific example of the first catalyst material 60 includes about 120 g/L of $CeO_2$—$ZrO_2$, with a Ce/Zr mol ratio of 75/25, as the first carrier material 64 and about 100 g/L of $La_{0.9}Sr_{0.1}MnO_3$ as the $NO_X$ oxidation catalyst 66. A specific example of the second catalyst material 62 includes about 120 g/L of $CeO_2$—$ZrO_2$, with a Ce/Zr mol ratio of 75/25, as the second carrier material 68, about 30 g/L of BaO as the $NO_X$ storage catalyst 70, and about 0.18 g/L of rhodium as the $NO_X$ reduction catalyst 70. A total of about 1.8 g/L of palladium may be dispersed on either the first or second carrier materials 64, 68 or over both the first and second carrier materials 64, 68.

The $NO_X$ oxidation, storage, and reduction catalysts 66, 70, 72 work together to convert $NO_X$ largely into $N_2$ through a multi-part reaction mechanism. When the engine 12 is combusting the lean A/F mixture 14, for instance, the $NO_X$ oxidation catalyst 66 dispersed in the first catalyst material 60 oxidizes NO contained in the oxygen-rich exhaust flow 18 into $NO_2$. At the same time, the $NO_X$ storage catalyst 54 dispersed in the second catalyst material 62 traps and stores both the native and newly-generated $NO_2$ as a nitrate species. The oxidation of NO and the storage of $NO_2$ occurs until the $NO_X$ storage catalyst 70 reaches or approaches its nitrate storage capacity. The stored nitrate species are then removed from the $NO_X$ storage catalyst 70 to regenerate nitrate trap sites for future $NO_2$ sorption. The release of $NO_X$ from the $NO_X$ storage catalyst 70 is accomplished by momentarily converting the lean A/F mixture 14 into the rich A/F mixture 16 so that combustion within the engine 12 produces the oxygen-depleted exhaust flow 20. The drop in oxygen content and the increase in reductants (i.e., CO, HC's, and $H_2$) in the oxygen-depleted exhaust flow 20 render the stored nitrate species thermodynamically unstable and cause $NO_X$ liberation. The available reductants then reduce the liberated $NO_X$ over the $NO_X$ reduction catalyst 72 dispersed in the second catalyst material 62. Once the regeneration of the $NO_X$ storage catalyst 70 is satisfactorily achieved, delivery of lean A/F mixture 14 may be restored to the engine 12 and the cycle repeated. The reductants contained in the oxygen-rich exhaust flow 18 (HC's) and the oxygen-depleted exhaust flow (CO, HC's, $H_2$) are also oxidized by the perovskite oxide particles in the $NO_X$ oxidation catalyst 66 and, if present, by palladium particles dispersed in either the first and/or second catalyst materials 60, 62.

A method of using the lean $NO_X$ trap 22 in the exhaust aftertreatment system 10 should be apparent to a skilled artisan given the above disclosure. The method includes delivering the lean A/F mixture 14 to the engine 12 for combustion. The lean A/F mixture 14 combusts inside engine's cylinders 28 and the resultant oxygen-rich exhaust flow 18 is communicated to the exhaust aftertreatment system 10. The lean $NO_X$ trap 22 receives the oxygen-rich exhaust flow 18 flow at the inlet 48 of the canister 44. The oxygen-rich exhaust flow 18 passes from the inlet 48 to the outlet 50 and traverses the support body 46 through the many flow-through channels 56. The first catalyst material 60, which is deposited on the wall surface 58 of the flow-through channels 56 upstream from the second catalyst material 62, oxidizes NO to $NO_2$ over the $NO_X$ oxidation catalyst 66 that includes perovskite oxide particles. The $NO_X$ storage catalyst 70 dispersed in the second catalyst material 62 traps the $NO_2$ contained in the oxygen-rich exhaust flow 18 and stores it as a nitrate species. Then, when appropriate, the method calls for converting the lean A/F mixture 14 into the rich A/F mixture 16 to deliver the rich A/F mixture 16 to the engine 12 for combustion. The rich A/F mixture 16 combusts inside the engine's cylinders 28 and the resultant oxygen-depleted exhaust flow 20 is communicated to the exhaust aftertreatment system 10. The oxygen-depleted exhaust flow 20 traverses the support body 46 through the many flow-through channels 58 and purges the $NO_X$ storage catalyst 70 of $NO_X$-derived nitrate species. The liberated $NO_X$ is reduced over the $NO_X$ reduction catalyst 72 to $N_2$ by available reductants contained in the oxygen-depleted exhaust flow 20. The method eventually calls for converting the rich A/F mixture 16 back to the lean A/F mixture 14.

Figure 4:
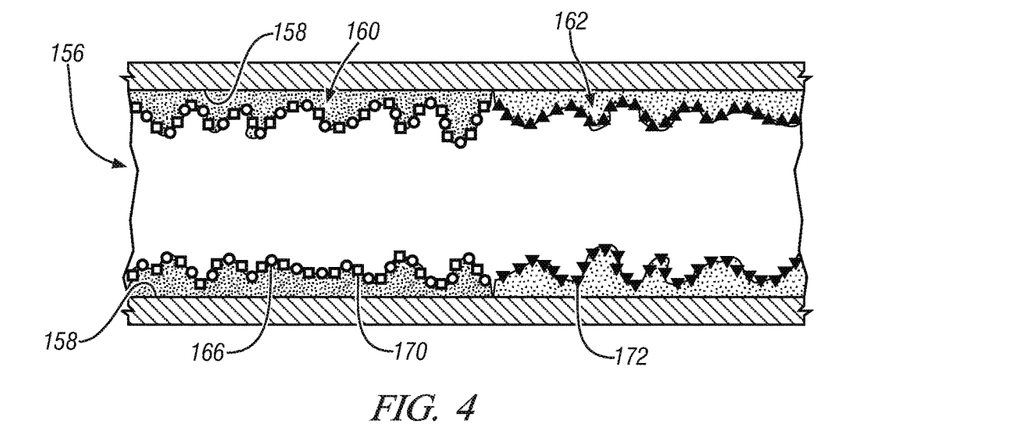
FIG. 4 is a partial magnified view of the lean $NO_X$ trap shown in FIG. 2 that depicts, in an idealized manner, a first catalyst material and a second catalyst material carried by a support body according to another embodiment of the invention.

A second embodiment of the exhaust aftertreatment system 10 is illustrated in FIG. 4. The exhaust aftertreatment system described here is a variation of the first embodiment (FIGS. 1-3) and, as such, uses like numerals to identify similar structural elements or materials. One difference is that the first catalyst material 160 comprises the $NO_X$ storage catalyst 170 instead of the second catalyst material 162. This arrangement of the catalysts 166, 170, 172 does not affect the overall mechanism by which the LNT 22 converts $NO_X$ into $N_2$. The $NO_X$ storage catalyst 170 is simply intermingled with the $NO_X$ oxidation catalyst that includes perovskite oxide particles, where NO oxidation to $NO_2$ occurs, as opposed to being intermingled with the $NO_X$ reduction catalyst 172, where liberated $NO_X$ is reduced to $N_2$.

Figure 5:
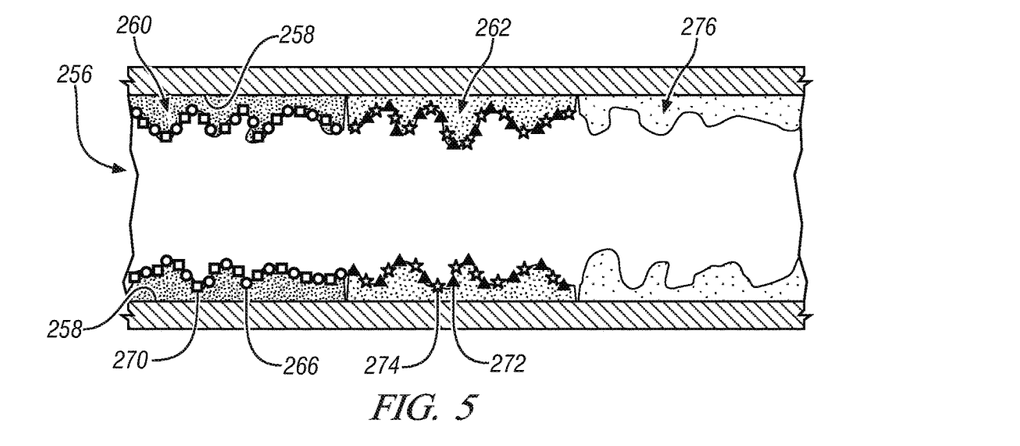
FIG. 5 is a partial magnified view of the lean $NO_X$ trap shown in FIG. 2 that depicts, in an idealized manner, a first catalyst material, a second catalyst material, and a third catalyst material, each carried by a support body according to yet another embodiment of the invention.

A third embodiment of the exhaust aftertreatment system 10 is illustrated in FIG. 5. The exhaust aftertreatment system described here is similar in many respects to the first embodiment (FIGS. 1-3) and, as such, uses like numerals to identify similar structural elements or materials. Some differences include (1) the first catalyst material 260 comprises the $NO_X$ oxidation catalyst 266 that includes perovskite oxide particles and the $NO_X$ storage catalyst 270 and (2) the second catalyst material 262 comprises the $NO_X$ reduction catalyst 272 and palladium particles 274. A third catalyst material 276 that exhibits ammonia selective catalytic reduction activity in the presence of a specified reductant is also deposited on the wall surface 258 of the flow-through channels 256 downstream from the second catalyst material 262 relative to the flow direction of the oxygen-rich or oxygen-depleted exhaust flow 18, 20.

The first catalyst material 260 and the second catalyst material 262 have already been described in sufficient detail. The third catalyst material 276 may be a microporous molecular sieve material that can catalytically reduce $NO_X$, in the presence of $O_2$, using absorbed ammonia or an absorbed hydrocarbon as a reductant. The microporous molecular sieve material may, for example, be a base metal ion-exchanged zeolite, a base metal oxide, or a base metal ion-substituted silicoaluminophosphate if the reductant sought to be absorbed is ammonia. Some examples of a suitable base metal ion-exchanged zeolite include a β-zeolite, a MFI-zeolite (i.e., ZSM-5), a Chabazite zeolite, or a USY (ultra-stable Y-type) zeolite, each of which is preferably ion-exchanged with one or more of Cu or Fe and commercially available from BASF Catalysts (Iselin, N.J.) and Johnson Matthey (London, UK). Some examples of a suitable base metal oxide include $V_2O_5$—$WO_3/TiO_2$ and $V_2O_5/TiO_2$. Some examples of a base metal ion-substituted silocoaluminophosphate include SAPO-5, SAPO-34, or SAPO-44, each of which is preferably ion-exchanged with one or more of Cu or Fe and commercially available from Novel Company (Shanghai, China). The microporous molecular sieve material may also, as another example, be silver-supported alumina ($Ag/Al_2O_3$) or an ion-exchanged base metal zeolite if the reductant sought to be absorbed is a hydrocarbon. Some examples of a suitable base metal ion-exchanged zeolite include a Y-zeolite which is preferably ion-exchanged with one or more of Na, Ba, Cu, or Co. Some examples of a suitable silicoaluminophosphate include SAPO-5, SAPO-34, or SAPO-44, each of which is preferably ion-exchanged with one or more of Na, Ba, Cu, or Co.

The serial arrangement of the first, second, and third catalyst materials 260, 262, 276 provides the LNT 22 with supplemental $NO_X$ conversion activity when the lean and rich A/F mixtures 14, 16 are cyclically delivered to the engine 12. The first catalyst material 266 functions as expected when exposed to the oxygen-rich exhaust flow 18—that is, the $NO_X$ oxidation catalyst 266 oxidizes NO to $NO_2$ and the $NO_X$ storage catalyst stores $NO_2$ as a nitrate species. The second catalyst material 262, more specifically the palladium particles 274, can oxidize the HC's somewhat effectively but is generally unable to oxidize NO that slips past the first catalyst material 260. The $NO_X$ that slips past the first catalyst material 260 and remains in the oxygen-rich exhaust flow 18 may nonetheless be selectively reduced by absorbed ammonia or an absorbed hydrocarbon contained in the third catalyst material 274.

The absorbed ammonia or hydrocarbon may be supplied to the third catalyst material 276 during cycling between the lean and rich A/F mixtures 14, 16 or by an appropriate reductant injection system. The changeover from the lean A/F mixture 14 to the rich A/F mixture 16, for example, communicates the oxygen-depleted exhaust flow 20 to the LNT 22. The first catalyst material 260 liberates $NO_X$ and the second catalyst material 262 reduces $NO_X$ to $N_2$ when exposed to the oxygen-depleted exhaust flow 20 as described before. The $NO_X$ reduction catalyst 272, especially when comprised of rhodium particles, and the palladium particles 274 also cooperatively facilitate an alternative reaction in which NO reacts with certain reductants ($CO$, $H_2$) to form small amounts of ammonia. The generated ammonia is eventually supplied to the third catalyst material 276 where it can accumulate until $NO_X$ arrives in the presence of $O_2$.

Figure 6:
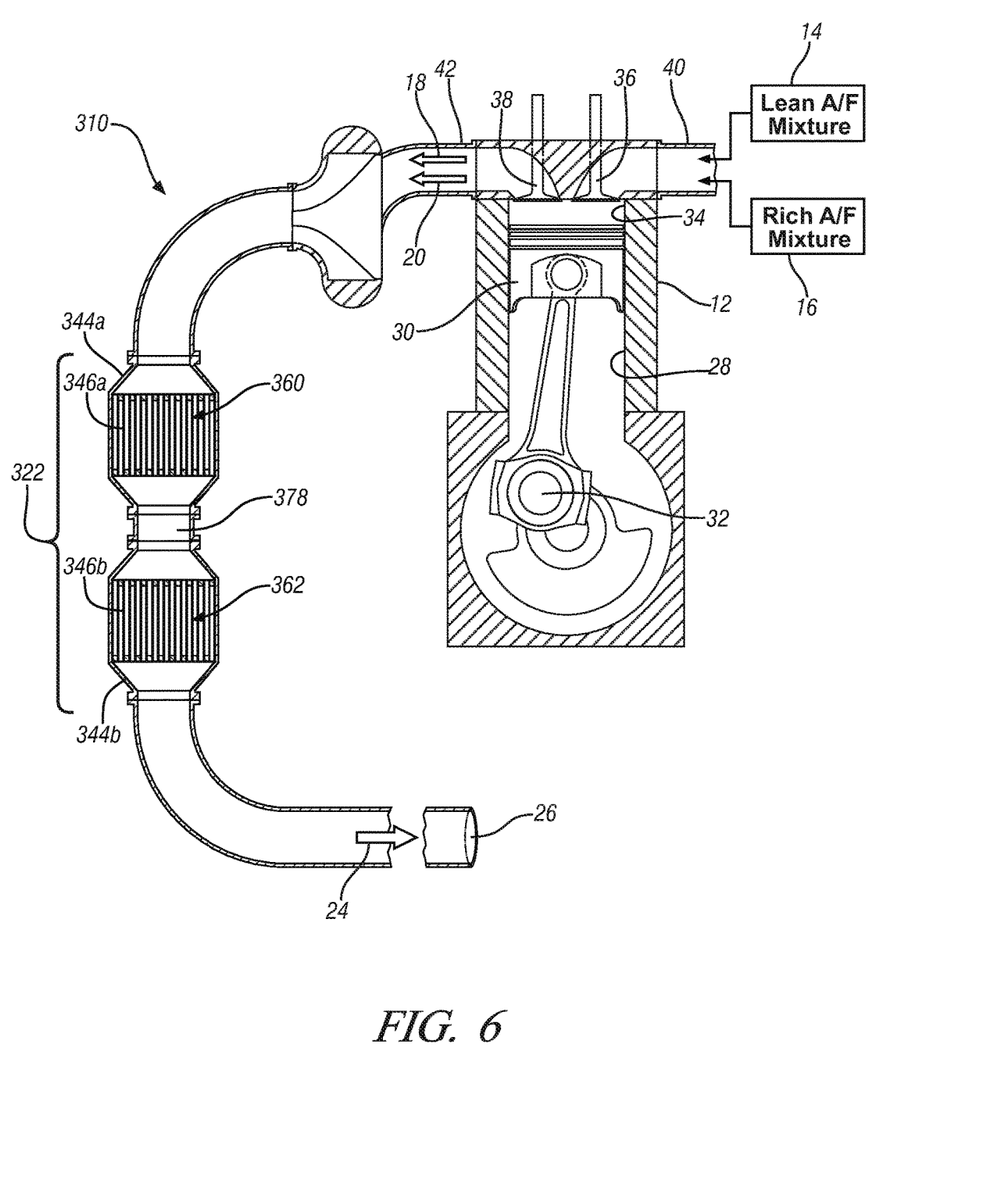
FIG. 6 is a schematic illustration of an exhaust aftertreatment system in which the first catalyst material and the second catalyst material shown in FIG. 3 are carried on separate support bodies.

A fourth embodiment of the exhaust aftertreatment system, identified as numeral 310, is illustrated in FIG. 6. This exhaust aftertreatment system 310 is a variation of the first embodiment (FIGS. 1-3) and, as such, uses like numerals to identify similar structural elements or materials. One difference here is that the LNT 322 includes a pair of partitioned canisters 344a, 344b that are fluidly connected by a smaller diameter intermediate piping segment 378. The upstream canister 344a houses a support body 346a that carries the first catalyst material 360 and the downstream canister 344b houses a support body 346b that carries the second catalyst material 362. The first catalyst material 360 and the second catalyst material 360 have the same compositions as the first embodiment shown and described in FIGS. 1-3. This embodiment of the exhaust aftertreatment system 310 converts $NO_X$ to $N_2$ in the same general fashion as described. It also carries the first catalyst material 360 and the second catalyst material 362 on separate support bodies 346a, 346b contained in separate canisters 344a, 344b. This structural arrangement of the LNT 322 facilitates maintenance and, furthermore, enhances turbulent flow through the exhaust aftertreatment system 310 and exhaust gas mixing since the oxygen-rich or oxygen-depleted exhaust flow 18, 20 has to navigate through two support bodies 346a, 346b separated by a smaller diameter piping segment 378.

Figure 7:
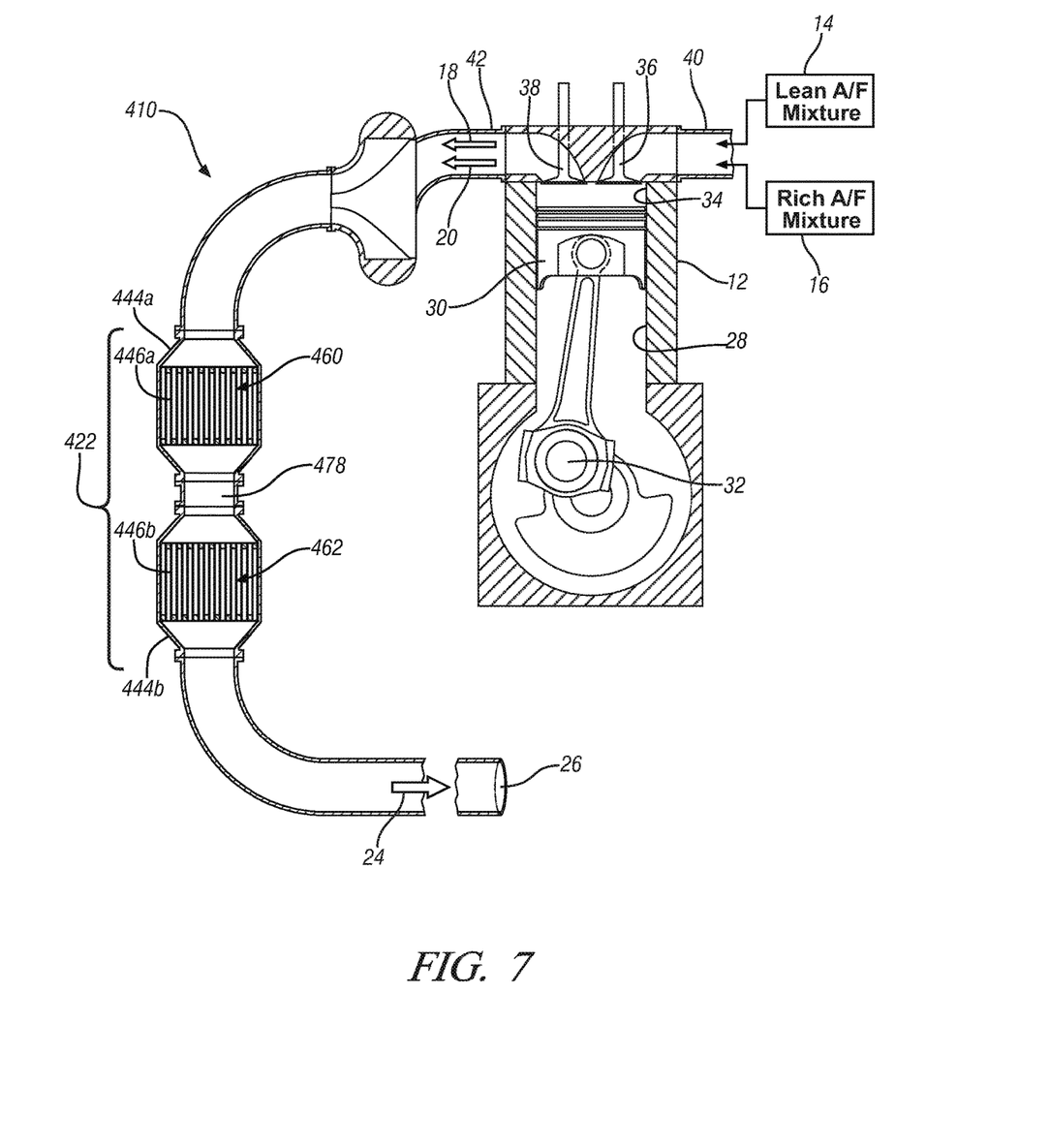
FIG. 7 is a schematic illustration of an exhaust aftertreatment system in which the first catalyst material and the second catalyst material shown in FIG. 4 are carried on separate support bodies.

A fifth embodiment of the exhaust aftertreatment system, identified as numeral 410, is illustrated in FIG. 7. This exhaust aftertreatment system 410 is a variation of the second embodiment (FIG. 4) and, as such, uses like numerals to identify similar structural elements or materials. One difference here is that the LNT 422 includes a pair of partitioned canisters 444a, 444b that are fluidly connected by a smaller diameter intermediate piping segment 478. The upstream canister 444a houses a support body 446a that carries the first catalyst material 460 and the downstream canister 444b houses a support body 446b that carries the second catalyst material 462. The first catalyst material 460 and the second catalyst material 460 have the same compositions as the second embodiment shown and described in FIG. 4. This embodiment of the exhaust aftertreatment system 410 converts $NO_X$ to $N_2$ in the same general fashion as described. It also carries the first catalyst material 460 and the second catalyst material 462 on separate support bodies 446a, 446b contained in separate canisters 444a, 444b. This structural arrangement of the LNT 422 provides the same maintenance and flow enhancements identified for the fourth embodiment (FIG. 6) just discussed.

Figure 8:
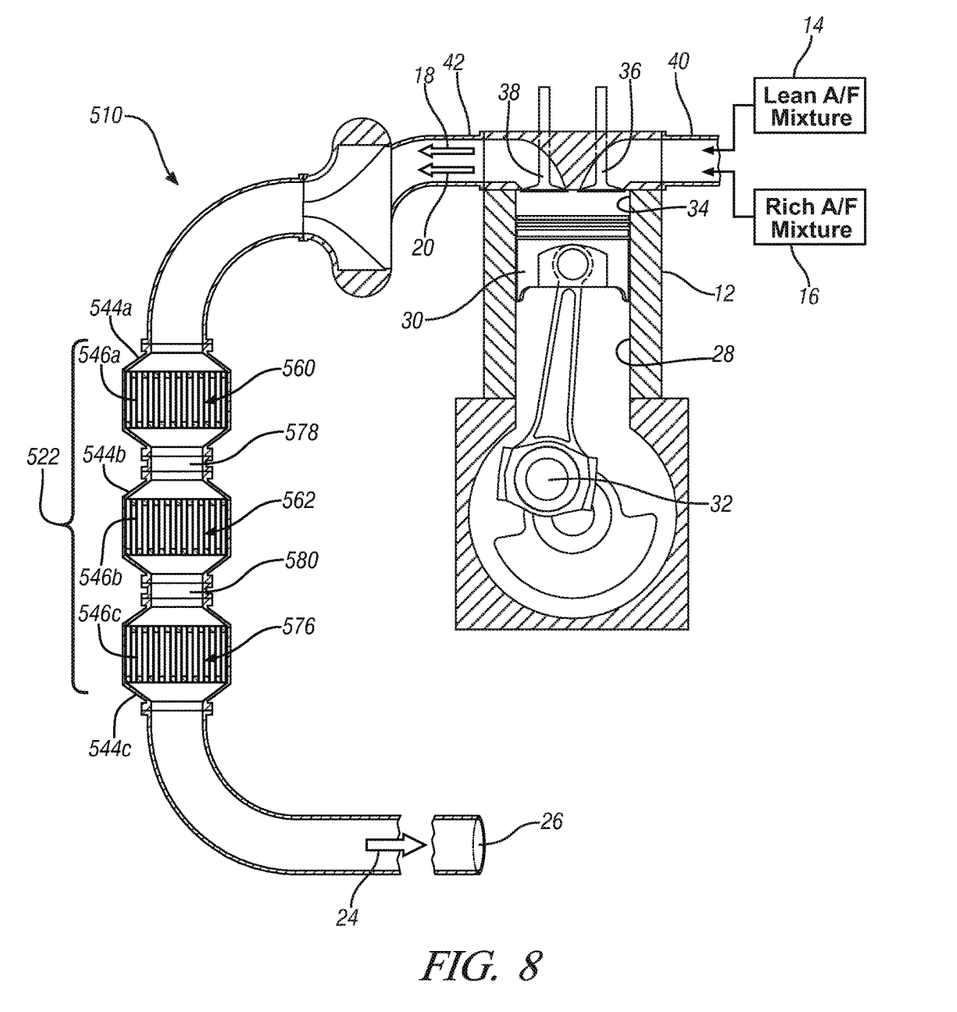
FIG. 8 is a schematic illustration of an exhaust aftertreatment system in which the first catalyst material, the second catalyst material, and the third catalyst material shown in FIG. 5 are carried on separate support bodies.

A sixth embodiment of the exhaust aftertreatment system, identified as numeral 510, is illustrated in FIG. 8. This exhaust aftertreatment system 510 is a variation of the third embodiment (FIG. 5) and, as such, uses like numerals to identify similar structural elements or materials. One difference here is that the LNT 522 includes three partitioned canisters 544a, 544b, 544c that are fluidly connected by smaller diameter intermediate piping segments 578, 580. The upstream canister 544a houses a support body 546a that carries the first catalyst material 560. The middle canister 544b located downstream from the upstream canister 544a houses a support body 546b that carries the second catalyst material 562. The downstream canister 544c located after the middle canister 544b houses a support body 546c that carries the third catalyst material 576. The first, second, and third catalyst materials 560, 562, 576 have the same compositions as the third embodiment shown and described in FIG. 5. This embodiment of the exhaust aftertreatment system 510 converts $NO_X$ to $N_2$ in the same general fashion as described and, additionally, provides supplemental selective catalytic $NO_X$ reduction for $NO_X$ that may slip past the first and second catalyst materials 560, 562 in the oxygen-rich exhaust flow 18. It also carries the first catalyst material 560, the second catalyst material 562, and the third catalyst material 576 on separate support bodies 546a, 546b, 546c contained in separate canisters 544a, 544b, 544c. This structural arrangement of the LNT 522 provides the same maintenance and flow enhancements identified for the fourth embodiment (FIG. 6) discussed earlier.

The above description of embodiments is merely exemplary in nature and, thus, variations thereof are not to be regarded as a departure from the spirit and scope of the invention.

What is claimed is:

1. A method comprising:
    supplying a combustion source with air and fuel at an air to fuel mass ratio that can be selectively varied to produce a lean mixture of air and fuel, in which the air to fuel mass ratio is above stoichiometry, and a rich mixture of air and fuel, in which the air to fuel mass ratio is at or below stoichiometry, the combustion source being coupled to an exhaust aftertreatment system that comprises a $NO_X$ oxidation catalyst that includes perovskite oxide particles, a $NO_X$ storage catalyst, and a $NO_X$ reduction catalyst wherein the $NO_X$ oxidation catalyst is intermingled with the $NO_X$ storage catalyst;
    combusting the lean mixture of air and fuel at the combustion source to produce an oxygen-rich exhaust flow that comprises nitrogen oxide gases ($NO_X$) including NO and $NO_2$;
    passing the oxygen-rich exhaust flow through the exhaust aftertreatment to (1) oxidize NO to $NO_2$ over the $NO_X$ oxidation catalyst and (2) store $NO_X$ as a nitrate species at the $NO_X$ storage catalyst;
    combusting the rich mixture of air and fuel at the combustion source to produce an oxygen-depleted exhaust flow; and
    passing the oxygen-depleted exhaust flow through the exhaust aftertreatment system to (1) release $NO_X$ from the $NO_X$ storage catalyst and (2) reduce $NO_X$ to $N_2$ over the $NO_X$ reduction catalyst.

2. The method according to claim 1, wherein the exhaust aftertreatment system comprises a first catalyst material and a second catalyst material positioned downstream from the first catalyst material relative to a flow direction through the exhaust aftertreatment system, the first catalyst material comprising the perovskite oxide particles, the second catalyst material comprising the $NO_X$ reduction catalyst, the first catalyst material comprising the $NO_X$ storage catalyst, and either the first catalyst material or the second catalyst material comprising palladium particles.

3. The method according to claim 2, wherein the perovskite oxide particles comprise at least one of $LaCoO_3$, $LaMnO_3$, $LaFeO_3$, $La_{0.9}Sr_{0.1}CoO_3$, $La_{0.9}Sr_{0.1}MnO_3$, or $La_{0.9}Sr_{0.1}FeO_3$, wherein the $NO_X$ storage catalyst comprises at least one of BaO, $BaCO_3$, or $K_2CO_3$ particles, wherein the $NO_X$ reduction catalyst comprises rhodium particles.

4. The method according to claim 2, wherein the exhaust aftertreatment system further comprises a third catalyst material located downstream from the second catalyst material relative to the flow direction, the third catalyst material comprising particles of a microporous molecular sieve material that can catalytically reduce $NO_X$ with an absorbed reductant in the presence of oxygen, the microporous molecular sieve material comprising at least one of a base metal ion-substituted zeolite, a base metal oxide, or a base metal ion-substituted silicoaluminophosphate.

5. The method according to claim 4, further comprising:
passing the oxygen-rich exhaust flow through the exhaust aftertreatment system along the flow direction to selectively reduce $NO_X$ in the presence of absorbed ammonia and oxygen at the third catalyst material; and
passing the oxygen-depleted exhaust flow through the exhaust aftertreatment system along the flow direction to form ammonia over the palladium and/or $NO_X$ reduction particles and supplying the ammonia to the third catalyst material for absorption therein.

6. A method comprising:
supplying a multi-cylinder internal combustion engine with air and fuel at an air to fuel mass ratio that can be selectively varied to produce a lean mixture of air and fuel, in which the air to fuel mass ratio is above stoichiometry, and a rich mixture of air and fuel, in which the air to fuel mass ratio is at or below stoichiometry, the engine being coupled to an exhaust aftertreatment system that comprises a first catalyst material and a second catalyst material, the second catalyst material being located downstream from the first catalyst material relative to a flow direction, the first catalyst material comprising a $NO_X$ oxidation catalyst that includes perovskite oxide particles, the second catalyst material comprising a $NO_X$ reduction catalyst, and the first catalyst material comprising a $NO_X$ storage catalyst;
combusting the lean mixture of air and fuel at the engine to produce an oxygen-rich exhaust flow that comprises nitrogen oxide gases ($NO_X$) including NO and $NO_2$;
passing the oxygen-rich exhaust flow through the exhaust aftertreatment system along the flow direction to (1) oxidize NO to $NO_2$ over the $NO_X$ oxidation catalyst at the first catalyst material and (2) store $NO_2$ at the $NO_X$ storage catalyst;
combusting the rich mixture of air and fuel at the engine to produce an oxygen-depleted exhaust flow; and
passing the oxygen-depleted exhaust flow through the exhaust aftertreatment system along the flow direction to (1) release $NO_X$ from the $NO_X$ storage catalyst and (2) reduce $NO_X$ to $N_2$ over the $NO_X$ reduction catalyst at the second catalyst material.

7. The method according to claim 6, wherein the first catalyst material comprises a first carrier material on which the $NO_X$ oxidation catalyst is dispersed, wherein the second catalyst material comprises a second carrier material on which the $NO_X$ storage catalyst and the $NO_X$ reduction catalyst are dispersed, and wherein the first and second carrier materials comprise at least one of a $CeO_2$—$ZrO_2$ material, alumina, or a zeolite.

8. The method according to claim 6, wherein the first catalyst material comprises a first carrier material on which the $NO_X$ oxidation catalyst and the $NO_X$ storage catalyst are dispersed, wherein the second catalyst material comprises a second carrier material on which the $NO_X$ reduction catalyst is dispersed, and wherein the first and second carrier materials comprise at least one of a $CeO_2$—$ZrO_2$ material, alumina, or a zeolite.

9. The method according to claim 6, wherein the perovskite oxide particles comprise at least one of $LaCoO_3$, $LaMnO_3$, $LaFeO_3$, $La_{0.9}Sr_{0.1}CoO_3$, $La_{0.9}Sr_{0.1}MnO_3$, or $La_{0.9}Sr_{0.1}FeO_3$, wherein the $NO_X$ storage catalyst comprises alkali or alkaline earth metal oxide particles, and wherein the $NO_X$ reduction catalyst comprises rhodium particles.

10. The method according to claim 9, wherein the first and second catalyst materials are carried on a flow-through support body that comprises flow-through channels, wherein are perovskite oxide particles are present in the first catalyst material in an amount that ranges from about 50 g to about 150 g per liter of available flow volume through the flow-through support body, wherein the rhodium particles are present in an amount that ranges from about 0.10 g to about 0.30 g per liter of available flow volume through the flow-through support body, and wherein the alkali or alkaline earth metal oxide particle are present in the first or second catalyst material in an amount that ranges from about 10 g to about 50 g per liter of available flow volume through the flow-through support body.

11. The method according to claim 6, wherein the exhaust aftertreatment system further comprises a third catalyst material located downstream from the second catalyst material relative to the flow direction, the third catalyst material comprising a microporous molecular seive material that can catalytically reduce $NO_X$ with an absorbed reductant in the presence of oxygen, and wherein the microporous molecular sieve material comprises particles of at least one of a base metal ion-substituted zeolite, a base metal oxide, or a base metal ion-substituted silicoaluminophosphate.

12. The method according to claim 11, wherein at least one of the first or second catalyst materials further comprises palladium particles.

13. The method according to claim 12, further comprising:
passing the oxygen-rich exhaust flow through the exhaust aftertreatment system along the flow direction to selectively reduce $NO_X$ in the presence of absorbed ammonia and oxygen at the third catalyst material; and
passing the oxygen-depleted exhaust flow through the exhaust aftertreatment system along the flow direction to form ammonia over the palladium and/or rhodium particles and supplying the ammonia to the third catalyst material for absorption therein.

14. A lean $NO_X$ trap for incorporation into an exhaust aftertreatment system that treats an exhaust flow moving in a flow direction, the lean $NO_X$ trap comprising:
a support body comprising an inlet end, an outlet end, and a surface over which at least a portion of an exhaust flow passes while moving in the flow direction and traversing the support body from the inlet end to the outlet end, the exhaust flow originating from a combustion source that is combusting a mixture of air and fuel defined by an air to fuel mass ratio which cycles between lean and rich;

a first catalyst material deposited on the surface of the support body, the first catalyst material comprising perovskite oxide particles;

a second catalyst material deposited on the surface of the support body downstream from the first catalyst material relative to the flow direction of the exhaust flow, the second catalyst material comprising rhodium particles; and alkali or alkaline earth metal oxide particles that can reversibly store $NO_2$ as a nitrate species being present in the first catalyst material.

15. The lean $NO_X$ trap according to claim 14, wherein the first catalyst material comprises a first carrier material on which the perovskite oxide particles and the alkali or alkaline earth metal oxide particles are dispersed, wherein the second catalyst material comprises a second carrier material on which the rhodium particles are dispersed, and wherein the first and second carrier materials comprise at least one of a $CeO_2$—$ZrO_2$ material, alumina, or a zeolite.

16. The lean $NO_X$ trap according to claim 14, wherein the first catalyst material comprises a first carrier material on which the perovskite oxide particles are dispersed, wherein the second catalyst material comprises a second carrier material on which the alkali or alkaline earth metal oxide particles and the rhodium particles are dispersed, and wherein the first and second carrier materials comprise at least one of a $CeO_2$—$ZrO_2$ material, alumina, or a zeolite.

17. The lean $NO_X$ trap according to claim 14, wherein the perovskite oxide particles comprise at least one of $LaCoO_3$, $LaMnO_3$, $LaFeO_3$, $La_{0.9}Sr_{0.1}CoO_3$, $La_{0.9}Sr_{0.1}MnO_3$, or $La_{0.9}Sr_{0.1}FeO_3$, and wherein the alkali or alkaline earth metal oxide particles comprise at least one of $BaO$, $BaCO_3$, or $K_2CO_3$.

18. The lean $NO_X$ trap according to claim 14, wherein at least one of the first catalyst material or the second catalyst material further comprises palladium particles.

19. The lean $NO_X$ trap according to claim 14, wherein the first catalyst material does not include any platinum particles and the second catalyst material does not include any platinum particles.

20. The lean $NO_X$ trap according to claim 14, further comprising a third catalyst material deposited on the surface of the support body downstream from the second catalyst material relative to the flow direction of the exhaust flow, the third catalyst material comprising particles of a microporous molecular sieve material that can catalytically reduce $NO_X$ with an absorbed reductant in the presence of oxygen, wherein the microporous molecular sieve material comprises particles of at least one of a base metal ion-substituted zeolite, a base metal oxide, or a base metal ion-substituted silicoaluminophosphate.

* * * * *